United States Patent [19]

Lepelletier

[11] Patent Number: 5,106,352

[45] Date of Patent: Apr. 21, 1992

[54] MULTISPEED AUTOMATIC TRANSMISSION FOR AUTOMOBILE VEHICLES

[76] Inventor: Pierre A. G. Lepelletier, 23 avenue Adrien Moisant, 78400 Chatou, France

[21] Appl. No.: 625,128

[22] Filed: Dec. 10, 1990

[30] Foreign Application Priority Data

Dec. 18, 1989 [FR] France .................. 89 16689

[51] Int. Cl.[5] ............................................. F16H 57/10
[52] U.S. Cl. ................................. 475/280; 475/282; 475/284; 475/286; 475/288; 475/290
[58] Field of Search ............... 475/284, 285, 329, 330, 475/280, 282, 286, 288, 290

[56] References Cited

U.S. PATENT DOCUMENTS

| | | | |
|---|---|---|---|
| 3,835,732 | 9/1974 | Mori et al. | 475/285 X |
| 3,863,524 | 2/1975 | Mori et al. | 475/284 X |
| 4,468,982 | 9/1984 | Fujita | 475/285 X |
| 4,638,688 | 1/1987 | Hiraiwa | 475/285 |
| 4,653,348 | 3/1987 | Hiraiwa | 475/285 X |
| 4,660,439 | 4/1987 | Hiraiwa | 475/285 X |
| 4,934,216 | 6/1990 | Sandel et al. | 475/285 X |
| 5,007,887 | 4/1991 | Asada | 475/285 X |

*Primary Examiner*—Dwight Diehl
*Attorney, Agent, or Firm*—Young & Thompson

[57] ABSTRACT

A multispeed automatic transmission for automobile vehicles having parallel input shaft output shaft includes two parallel gearsets and of constant-mesh gearwheels providing two fixed speed ratios. The second speed ratio is higher than the first speed ratio and in same direction. A first power path using the first fixed speed ratio includes a first control clutch and a second control clutch, and a second power path using the second fixed speed ratio includes a third control clutch. Further, the transmission includes a double planetary gearset, a first control brake and a second control brake. Alternatively, the input shaft and output shaft are in alignment and one of the two speed ratios is a direct drive. The transmission features six forward speeds, a braked neutral and a reverse drive.

17 Claims, 7 Drawing Sheets

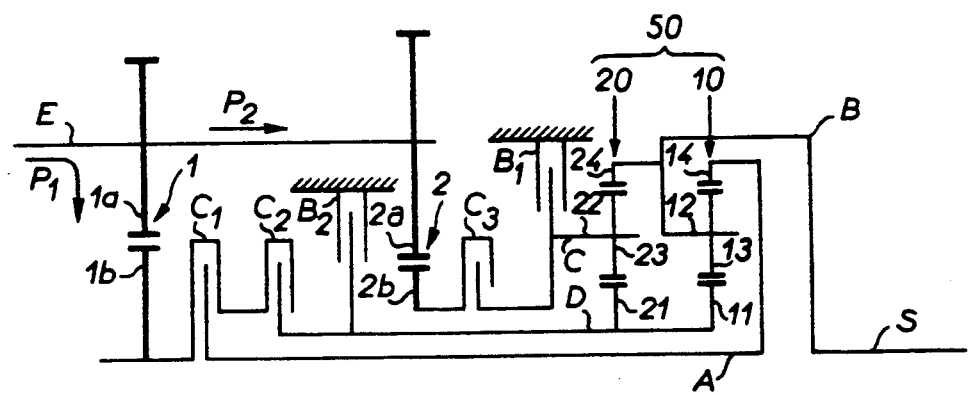
FIG.1
FIG.2
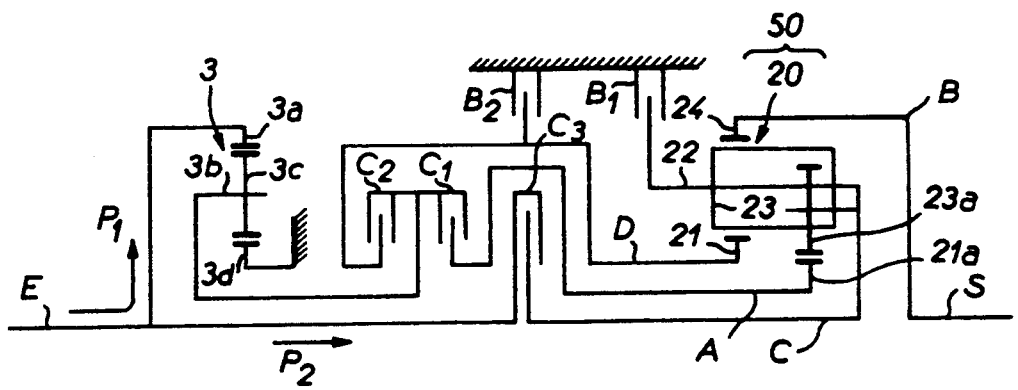
FIG.3

MULTISPEED AUTOMATIC TRANSMISSION FOR AUTOMOBILE VEHICLES

BACKGROUND OF THE INVENTION

1. Field of the invention

The present invention relates to automatic transmissions, in particular for automobile vehicles, comprising planetary gearsets controlled by friction elements such as clutches and brakes, and usually coupled to a start-up coupling device subject to slip, such as a hydraulic torque converter or a fluid coupling, with or without a lock-up clutch.

2. Description of the Prior Art

Conventional three-speed transmissions of this kind have been known for a long time; they utilize a double planetary gearset, four to five friction elements, and a hydraulic torque converter. Complex four-speed transmissions are also known; they are based on the aforesaid conventional three-speed transmissions to which are added a double-ratio single planetary gearset and two friction elements, resulting in assemblies which include one double planetary gearset, one single planetary gearset, six to seven friction elements, together with a torque converter and a lock-up clutch.

These complex four-speed transmissions, however, are of considerable bulk, weight and cost, thus limiting their use to luxury, rear-wheel drive vehicles with longitudinal engines, and making such use very difficult or even impossible on increasingly popular front-wheel drive vehicles with transverse engines. For such vehicles, compact four-speed transmissions have therefore been specifically developed, utilizing a double planetary gearset and five to six friction elements, together with a torque converter and optionally a lock-up clutch.

Such compact four-speed transmissions nowadays tend to replace the conventional three-speed transmissions. Hence, new complex five-speed and occasionally six-speed transmissions are presently being proposed; they are based on compact four-speed transmissions as described above to which are added a double-ratio single planetary gearset and two friction elements, as in the case of conventional three-speed transmissions. New assemblies have thus been developed utilizing a total of one double planetary gearset, one single planetary gearset, seven to eight friction elements, together with a torque converter and a lock-up clutch.

These new complex five- or six-speed transmissions then have the same bulk, weight and cost inconveniences as the above-mentioned complex four-speed transmissions which limit their use to luxury, rear-wheel drive vehicles with longitudinal engines. Furthermore, serious restrictions arise in determining suitably spaced gear ratios, thus reducing overall quality of the transmission.

Other solutions have been occasionally proposed, but they are generally as complex, and usually have the same inconveniences.

The object of the present invention is thus a transmission which avoids the inconveniences of the complex transmissions and other solutions described above. This means an altogether compact, multispeed automatic transmission, suitable for front-wheel drive, transverse engine vehicles, which features a minimum number of friction elements, and always offers judiciously spaced gear ratios, with high design flexibility.

SUMMARY OF THE INVENTION

In accordance with the invention, there is provided a multispeed automatic transmission, in particular for automobile vehicles, comprising between an input shaft and an output shaft and housed in a casing: a first power path having a first fixed speed ratio and including a first control clutch and a second control clutch, a second power path having a second fixed speed ratio, higher than the first fixed speed ratio and in the same direction, and including a third control clutch, and first and second control brakes being associated with respective ones of the power paths, a double planetary gearset, concentric with the output shaft and including in order of rotational speed, first, second, third and fourth members, the first control clutch being operable to couple the first member to the input shaft through the first power path, the second member being fixed for rotation with the output shaft, the third control clutch being operable to couple the third member to the input shaft through the second power path, the first control brake being operable to fix the third member against rotation, the second control clutch being operable to couple the fourth member to the input shaft through the first power path, and the second control brake being operable to fix the fourth member against rotation.

Such a transmission thus provides six forward gears, a braked neutral position—i.e. a condition in which the input shaft is free to rotate and the output shaft is held against rotation—and a reverse drive by selective operation in pairs of said first, second and third control clutches and said first and second control brakes, said first control clutch and said first control brake being operable to define a first forward gear, said first control clutch and said second control brake being operable to define a second forward gear, said first control clutch and said second control clutch being operable to define a third forward gear, said first control clutch and said third control clutch being operable to define a fourth forward gear, said second control clutch and said third control clutch being operable to define a fifth forward gear, said third control clutch and said second control brake being operable to define a sixth forward gear, said first and second control brakes being operable to define the braked neutral position, and said second control clutch and said first control brake being operable to define reverse drive.

U.S. Pat. No. 3,577,804 (Kazuhiko Ohno) describes an automatic four-speed transmission which includes, like the present invention, a double planetary gearset at the output, and five control means, three clutches and two brakes. The input shaft is divided in two portions for utilization of two power paths, a hydrokinetic path and a mechanical path, with a hydraulic torque converter. But the speed ratios of the two power paths are same. In contrast, the two power paths of a transmission according to the present invention have different speed ratios. This yields in the present invention both an increase in the spread of the transmission, i.e. the quotient of the highest and lowest gear ratios, and two additional gear ratios to obtain further improved steps between successive gear ratios.

In accordance with another feature of the invention, and depending on whether the input and output shafts are parallel or in alignment, the fixed speed ratios of the two power paths are provided by two parallel gearsets of constant-mesh gearwheels, or by a three-member planetary gearset having a member fastened to the casing and a direct drive.

In accordance with a further feature of the invention, the input shaft comprises a first coaxial shaft which forms an input for the first power path and is coupled to the turbine of a hydraulic torque converter or of a fluid coupling subject to slip, and also a second coaxial shaft which forms an input for the second power path and is coupled to the impeller not subject to slip, whereby the reverse drive, the first, second and third gears are subject to the entire slip of the torque converter or of the fluid coupling, the fourth and fifth gears are subject to a partial slip, and the sixth gear is not subject to slip.

Furthermore, a freewheel device could be added between the two coaxial input shafts so as to prevent the first shaft from rotating faster than the second, whereby slip would not occur in fifth gear in traction, nor during engine braking in reverse drive, first, second, third or fourth gears.

The features and advantages of the invention will further emerge from the following description given by way of example with reference to the accompanying drawings. dr

BRIEF DESCRIPTION OF THE DRAWINGS

FIG. 1 is a schematic view of a first embodiment of the invention, with, parallel input and output shafts, and a first type of double planetary gearset;

FIG. 2 shows the selective table of friction elements;

FIG. 3 is a schematic view of a second embodiment of the invention, with inline input and output shafts, and a second type of double planetary gearset;

DESCRIPTION OF THE PREFERRED EMBODIMENTS

Figure 4:
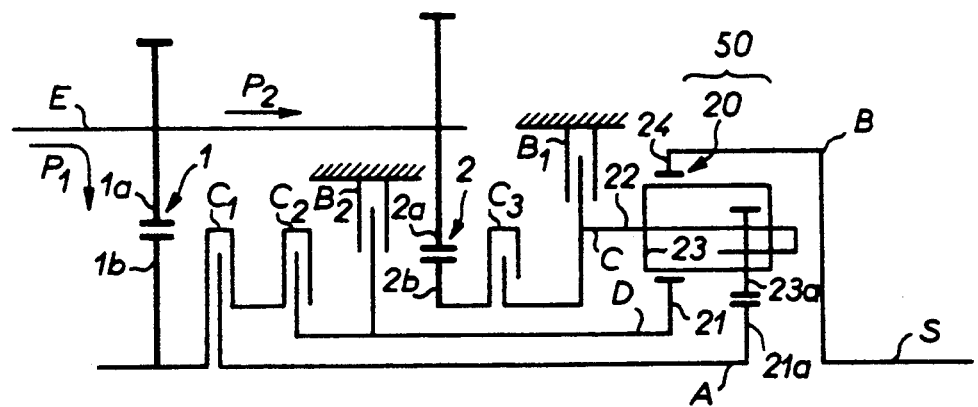
FIG. 4 shows a variation of the embodiment of FIG. 1, using the second type of double planetary gearset shown in FIG. 3.

In the first embodiment of FIG. 1, a transmission in accordance with the invention includes an input shaft E and an output shaft S located in a casing, these two shafts being parallel.

A first parallel gearset 1 of constant-mesh gearwheels includes a gear $1a$ fixed to the input shaft E and a gear $1b$ connected to a first control clutch $C_1$ and to a second control clutch $C_2$, these two clutches being concentric with the output shaft S. The first gearset 1 forms a first power path $P_1$ having a first fixed speed ratio $G_1$.

A second parallel gearset 2 of constant-mesh gearwheels includes a gear $2a$ fixed to the input shaft E and a gear $2b$ connected to a third control clutch $C_3$, this clutch being concentric with the output shaft S. The second gearset 2 forms a second power path $P_2$ having a second fixed speed ratio $G_2$.

The fixed speed ratios $G_1$ and $G_2$ are in the same direction, and the gears $1a$, $1b$, $2a$, $2b$ are selected in such a manner that $G_2$ is higher than $G_1$.

A double planetary gearset 50 comprising four members referred to as A, B, C, D in order of their respective rotational speeds, includes two three-member planetary gearsets, or basic gearsets 10, 20. The basic gearset 10 has a planet carrier 12 carrying planet pinions 13 meshing with a sun gear 11 and with a ring gear 14. The basic gearset 20 has a planet carrier 22 carrying planet pinions 23 meshing with a sun gear 21 and with a ring gear 24. The first member A is formed by the ring gear 14 of the gearset 10, the second member B is formed by the planet carrier 12 of the gearset 10 fixed for rotation with the ring gear 24 of the gearset 20, the third member C is formed by the planet carrier 22 of the gearset 20, and the fourth member D is formed by the sun gears 11 and 21 of the gearsets 10 and 20 fixed for rotation with each other.

The first member A is associated with the first control clutch $C_1$, the second member B is fixed for rotation with the output shaft S, the third member C is associated with the third control clutch $C_3$ and with a first control brake $B_1$, and the fourth member D is associated with the second control clutch $C_2$ and with a second control brake $B_2$.

Operation is as follows:

In first gear, the first control clutch $C_1$ and the first control brake $B_1$ are engaged. The first member A is driven according to speed ratio $G_1$ and the third member C is held against rotation. Motion is transmitted according to speed ratio $G_1$ and the low reduction ratio of the double planetary gearset 50.

In second gear, the first control clutch $C_1$ and the second control brake $B_2$ are engaged. The first member A is driven according to speed ratio $G_1$ and the fourth member D is held against rotation. Motion is transmitted according to speed ratio $G_1$ and the intermediate reduction ratio of the double planetary gearset 50.

In third gear, the first and second control clutches $C_1$ and $C_2$ are engaged. The first and fourth members A and D and the double planetary gearset 50 are driven as a unit according to speed ratio $G_1$. Motion is transmitted at speed ratio $G_1$.

In fourth gear, the first and third control clutches $C_1$ and $C_3$ are engaged. The first member A is driven according to speed ratio $G_1$ and the third member C is driven according to speed ratio $G_2$ higher than $G_1$.

Motion is transmitted according to a ratio intermediate speed ratios $G_1$ and $G_2$.

In fifth gear, the second and third control clutches $C_2$ and $C_3$ are engaged. The third member C is driven according to $G_2$ and the fourth member D is driven according to $G_1$ lower than $G_2$. Motion is transmitted according to $G_2$ and an intermediate overdrive ratio due to the double planetary gearset 50.

In sixth gear, the third control clutch $C_3$ and the second control brake $B_2$ are engaged. The third member C is driven according to $G_2$ and the fourth member D is held against rotation. Motion is transmitted according to $G_2$ and the entire overdrive ratio of the double planetary gearset 50.

In the braked neutral position, the first and second control brakes $B_1$ and $B_2$ are engaged. The third and fourth members C and D and the double planetary gearset 50 are held stationary as a unit. The output shaft S is held against rotation while the input shaft E is free to rotate. No motion is transmitted.

In reverse drive, the second control clutch $C_2$ and the first control brake $B_1$ are engaged. The fourth member D is driven according to $G_1$ and the third member C is held against rotation. Motion is transmitted according to $G_1$ and the reverse drive ratio of the double planetary gearset 50.

FIG. 2 shows the selective table of the friction elements in relation with these eight operating modes. It will be noted that these eight modes correspond in fact to ten combinations of pairs of the three clutches and two brakes, minus the two prohibited combinations of the third clutch $C_3$ with the first brake $B_1$ and of the second clutch $C_2$ with the second brake $B_2$, which hold the input shaft E against rotation and release the output shaft S. It will also be noted that the change from each combination to the next, or to the one thereafter, is achieved throughout the whole range by changing only one of the two friction elements engaged, i.e. exclusively by single transition shifts, which readily lend themselves to any kind of control.

Reference should now be made to FIG. 3, which shows a schematic view of a second embodiment of a transmission in accordance with the invention, in which the input shaft E and output shaft S are in alignment. All parts common to FIGS. 1 and 3 or parts having the same functions keep the same reference numbers.

A simple planetary gearset 3 including a ring gear 3a fastened to the input shaft E, a planet carrier 3b connected to the first control clutch $C_1$ and to the second control clutch $C_2$, planet pinions 3c, and a sun gear 3d fixed relative to the casing, forms the first power path $P_1$ having a first fixed speed ratio $G_1$ lower than unity.

The input shaft E directly drives the third control clutch $C_3$ and forms the second power path $P_2$ thus coming down to a direct drive, the second fixed speed ratio $G_2$ being equal to unity.

The double planetary gearset 50 comprising four members referred to as A, B, C, D in order of their respective rotational speeds, is of the Ravigneaux type, and includes the basic gearset 20 of figure 1, whose planet carrier 22 carries additional planet pinions 23a meshing with the planet pinions 23 and with an additional sun gear 21a. The first member A is formed by the additional sun gear 21a, the second member B is formed by the ring gear 24, the third member C is formed by the planet carrier 22, and the fourth member D is formed by the sun gear 21.

The four members A, B, C, D are associated with the three control clutches $C_1$, $C_2$, $C_3$, and two control brakes $B_1$, $B_2$ as in FIG. 1. The description of operation is the same as that described above and the selective table of FIG. 2 applies unchanged.

Figure 5:
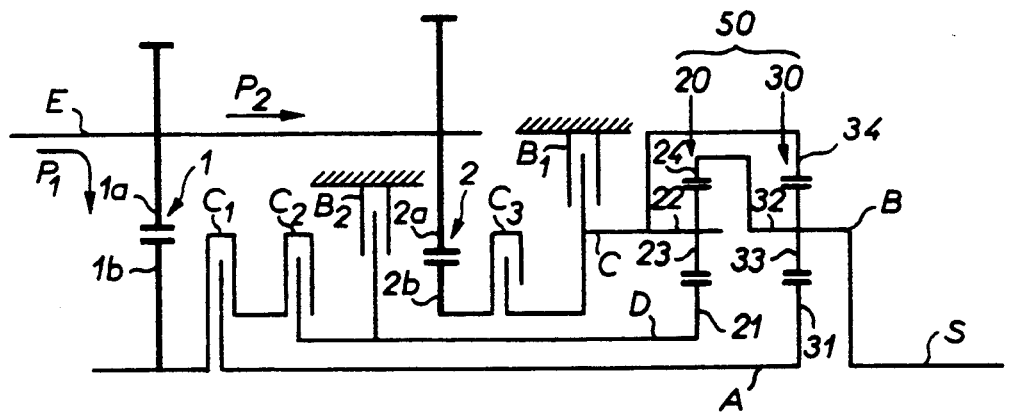
FIG. 5 shows a variation of the embodiment of FIG. 1, using a third type of double planetary gearset.
Figure 6:
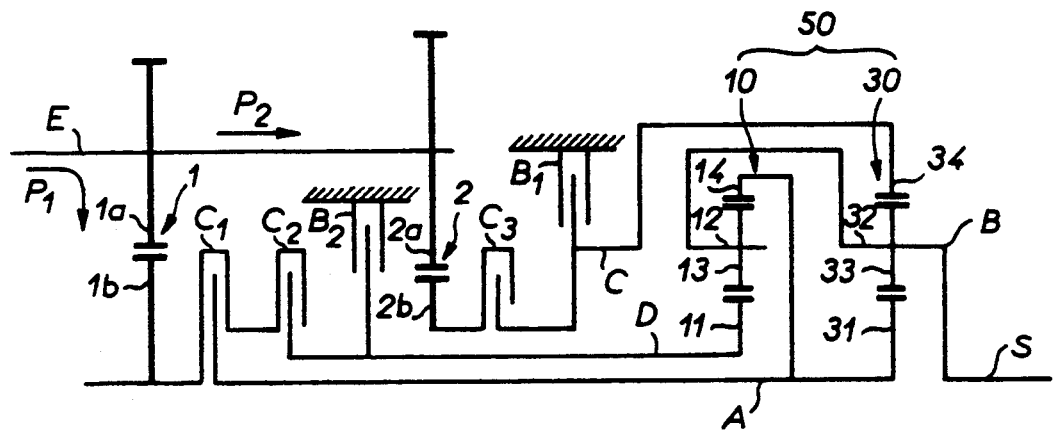
FIG. 6 shows a variation of the embodiment of FIG. 1, using a fourth type of double planetary gearset.

Reference should now be made to FIGS. 4, 5 and 6 which show successive variations of the embodiment of FIG. 1 with various types of double planetary gearsets 50. All common parts or parts having the same functions as in FIG. 1 keep the same reference numbers.

In FIG. 4, the double planetary gearset 50 is that of FIG. 3 and is of the Ravigneaux type.

In FIG. 5, the double planetary gearset 50 includes the basic gearset 20 of FIG. 1, and a basic gearset 30 having a planet carrier 32 carrying planet pinions 33 meshing with a sun gear 31 and with a ring gear 34. The first member A is formed by the sun gear 31 of the gearset 30, the second member B is formed by the ring gear 24 of the gearset 20 fixed for rotation with the planet carrier 32 of the gearset 30, the third member C is formed by the planet carrier 22 of the gearset 20 fixed for rotation with the ring gear 34 of the gearset 30, and the fourth member D is formed by the sun gear 21 of the gearset 20.

In FIG. 6, the double planetary gearset 50 includes the basic gearset 10 of FIG. 1 and the basic gearset 30 of FIG. 5. The first member A is formed by the ring gear 14 of the gearset 10 fixed for rotation with the sun gear 31 of the gearset 30; the second member B is formed by the planet carriers 12 and 32 of the gearsets 10 and 30 fixed for rotation with each other, the third member C is formed by the ring gear 34 of the gearset 30, and the fourth member D is formed by the sun gear 11 of the gearset 10.

In all these figures, the four members A, B, C, D are associated with the three control clutches $C_1$, $C_2$, $C_3$, and two control brakes $B_1$, $B_2$ as previously. The description of operation remains that of the embodiment of figure 1 and the selective table of friction elements that of FIG. 2.

Examples 1 and 2 below are selected to provide transmission ratios common to all figures 1, 3, 4, 5 and 6, i.e. transmission ratios are unchanged—or proportional in the case of FIG. 3—offering the same steps with only slight differences. The Ravigneaux gearsets of FIGS. 3 and 4 are clearly the same in both examples.

EXAMPLE 1

FIGS. 1, 4, 5 and 6.

| Parallel gearsets | | Basic planetary gearsets | |
|---|---|---|---|
| Gearset 1 | | Gearset 10 | |
| Gear 1a | 35 teeth | Sun gear 11 | 50 teeth |
| Gear 1b | 43 teeth | Ring gear 14 | 88 teeth |
| Speed ratio $G_1$ | 0.814 | Planet pinions 13 | 19 teeth |
| Gearset 2 | | Gearset 20 | |
| Gear 2a | 43 teeth | Sun gear 21 | 41 teeth |
| Gear 2b | 35 teeth | Ring gear 24 | 85 teeth |
| Speed ratio $G_2$ | 1.229 | Planet pinions 23 | 22 teeth |
| | | Gearset 30 | |
| | | Sun gear 31 | 50 teeth |
| | | Ring gear 34 | 88 teeth |
| | | Planet pinions 33 | 19 teeth |
| | | Ravigneaux gearset | |
| | | Sun gear 21 | 41 teeth |
| | | Ring gear 24 | 85 teeth |
| | | Planet pinions 23 | 22 teeth |

-continued

|  | Planet pinions 23a | 23 teeth |
|---|---|---|
|  | Sun gear 21a | 31 teeth |

| Gears | Transmission ratios | Steps |
|---|---|---|
| 1st | 3.383 |  |
|  |  | } 1.754 |
| 2nd | 1.928 |  |
|  |  | } 1.569 |
| 3rd | 1.229 |  |
|  |  | } 1.325 |
| 4th | 0.927 |  |
|  |  | } 1.325 |
| 5th | 0.700 |  |
|  |  | } 1.274 |
| 6th | 0.549 |  |
| Reverse drive | 2.556 |  |

EXAMPLE 2

FIG. 3.

| Simple planetary gearset 3 |  | Ravigneaux gearset |  |
|---|---|---|---|
| Ring gear 3a | 61 teeth | Sun gear 21 | 41 teeth |
| Sun gear 3d | 31 teeth | Ring gear 24 | 85 teeth |
| Planet pinions 3c | 15 teeth | Planet pinions 23 | 22 teeth |
| Speed ratio $G_1$ | 0.663 | Planet pinions 23a | 23 teeth |
|  |  | Sun gear 21a | 31 teeth |

| Gears | Transmission ratios | Steps |
|---|---|---|
| 1st | 4.135 |  |
|  |  | } 1.750 |
| 2nd | 2.363 |  |
|  |  | } 1.567 |
| 3rd | 1.508 |  |
|  |  | } 1.323 |
| 4th | 1.140 |  |
|  |  | } 1.325 |
| 5th | 0.860 |  |
|  |  | } 1.275 |
| 6th | 0.675 |  |
| Reverse drive | 3.127 |  |

These transmission ratios, common to FIGS. 1, 3, 4, 5 and 6, show a very favorable progression from one to the next, and are perfectly suited to five- and six-speed transmissions. Five-speed transmissions are obtained, e.g., by deleting either first or sixth gear from a six-speed transmission.

Starting from these examples, modifications or gear sizes would make it easy to offer a large diversity of new transmission ratios, again set in very favorable progressions.

Figure 7:
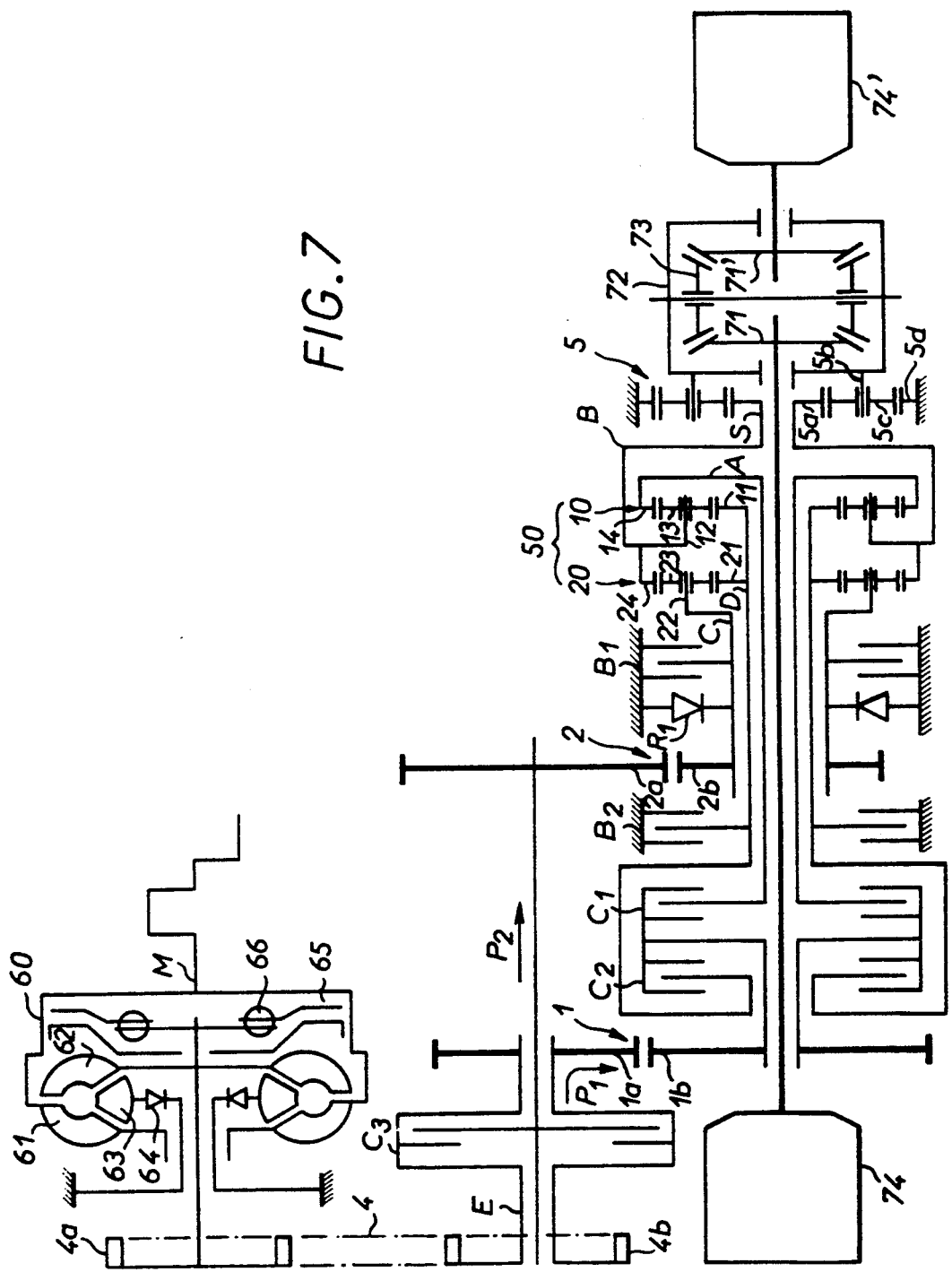
FIG. 7 is a schematic view of a transmission derived from the embodiment of FIG. 1, driven by a hydraulic torque converter, and offset mounted alongside a long transverse engine.

Reference should now be made to FIG. 7, which is a schematic view of a transmission derived from the embodiment of FIG. 1, and offset mounted with respect to a long transverse engine.

In a conventional way, the engine crankshaft M drives a hydraulic torque converter 60 including an impeller 61, a turbine 62, a stator 63, a freewheel device 64, a lock-up clutch 65, and a torsional vibration damper 66. The turbine 66 drives the input shaft E of the transmission by means of a drive chain 4 mounted on a drive sprocket 4a connected to the turbine 62 and on a driven sprocket 4b fastened to the input shaft E.

All parts common to figures 1 and 7 or parts having the same functions keep the same reference numbers. In contrast of FIG. 1, the control clutch $C_3$ is mounted on the input shaft ahead of the second parallel gearset 2 immediately after the driven sprocket 4b. An arrangement of this kind does not modify in any way either the operation, which remains as described in FIG. 1, or the selective table of friction elements, which remains that of FIG. 2. Furthermore, a freewheel device $R_1$ added in parallel with the first control brake $B_1$ to facilitate first-/second up-shifts and second/first down-shifts in a manner that is known per se, does not otherwise change operation.

In a conventional way, the transmission also utilizes an additional planetary gearset 5 including a sun gear 5a fixed to the output shaft S, a planet carrier 5b fixed to a differential assembly 72, a set of planet pinions 5c, and a ring gear 5d fixed to the casing, providing a final reduction ratio. The differential assembly 72 includes planet pinions 73 meshing with sun gears 71 and 71', which drive the two lateral outputs 74 and 74' to the driving wheels.

Considering the small number of components of such a transmission in accordance with the invention, it will be understood that the distance between the two lateral outputs 74 and 74' is comparable to that of existing automatic transmissions of similar architecture, having four speeds only.

Examples 3 and 4 below can evidently be applied identically to FIGS. 1 and 7. As in examples 1 and 2, transmission ratios concern input shaft E and output shaft S. They do not include the drive chain ratio nor the final reduction ratio.

EXAMPLE 3

FIGS. 1 and 7.

| Parallel gearsets |  | Basic planetary gearsets |  |
|---|---|---|---|
| Gearset 1 |  | Gearset 10 |  |
| Gear 1a | 33 teeth | Sun gear 11 | 37 teeth |
| Gear 1b | 49 teeth | Ring gear 14 | 77 teeth |
| Speed ratio $G_1$ | 0.673 | Planet pinions 13 | 20 teeth |
| Gearset 2 |  | Gearset 20 |  |
| Gear 2a | 45 teeth | Sun gear 21 | 37 teeth |
| Gear 2b | 37 teeth | Ring gear 24 | 77 teeth |
| Speed ratio $G_2$ | 1.216 | Planet pinions 23 | 20 teeth |

| Gears | Transmission ratios | Steps |
|---|---|---|
| 1st | 3.683 |  |
|  |  | } 1.675 |
| 2nd | 2.198 |  |
|  |  | } 1.481 |
| 3rd | 1.485 |  |
|  |  | } 1.481 |
| 4th | 1.003 |  |
|  |  | } 1.481 |
| 5th | 0.677 |  |
|  |  | } 1.219 |
| 6th | 0.555 |  |
| Reverse drive | 3.090 |  |

EXAMPLE 4

FIGS. 1 and 7.

| Parallel gearsets |  | Basic planetary gearsets |  |
|---|---|---|---|
| Gearset 1 |  | Gearset 10 |  |
| Gear 1a | 35 teeth | Sun gear 11 | 37 teeth |
| Gear 1b | 47 teeth | Ring gear 14 | 71 teeth |
| Speed ratio $G_1$ | 0.745 | Planet pinions 13 | 17 teeth |
| Gearset 2 |  | Gearset 20 |  |
| Gear 2a | 45 teeth | Sun gear 21 | 37 teeth |
| Gear 2b | 37 teeth | Ring gear 24 | 83 teeth |

-continued

| Speed ratio $G_2$ | 1.216 | Planet pinions 23 | 23 teeth |
|---|---|---|---|

| Gears | Transmission ratios | | Steps |
|---|---|---|---|
| 1st | 3.612 | | |
| | | } | 1.768 |
| 2nd | 2.043 | | |
| | | } | 1.521 |
| 3rd | 1.343 | | |
| | | } | 1.398 |
| 4th | 0.961 | | |
| | | } | 1.370 |
| 5th | 0.701 | | |
| | | } | 1.233 |
| 6th | 0.569 | | |
| Reverse drive | 3.012 | | |

These new ratios are as favorable as those of Examples 1 and 2, and offer considerable possibilities for both five- and six-speed transmissions. Furthermore, it is possible to move the transmission along its axis, so as to set the two lateral outputs 74 and 74' at equal distance from the driving wheels, with equal-length drive shafts.

It will be appreciated that the invention then makes it possible, not only to substitute perfectly well designed five- or six-speed automatic transmissions for existing transmissions of similar architecture having four speeds only, but also to remedy the common drawback of such transmissions, which is to require a very short drive shaft on one side, prejudicial to vehicle steering and suspension.

Figure 8:
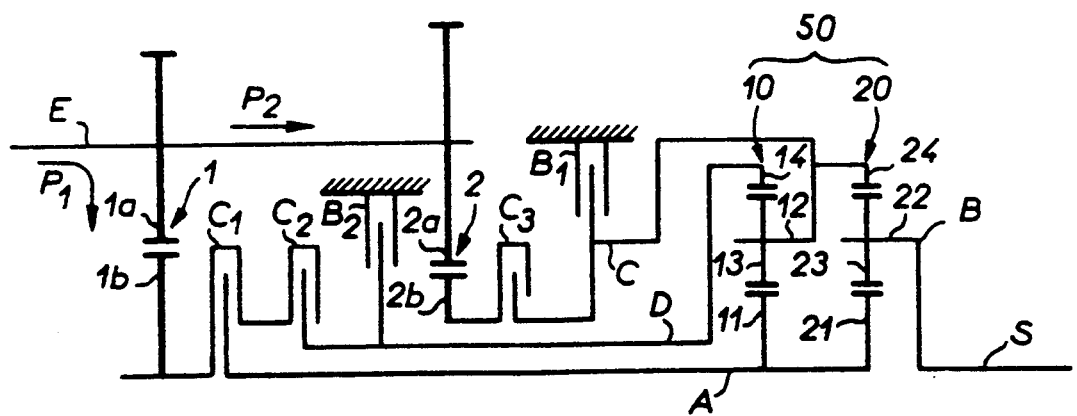
FIG. 8 shows a variation of the embodiment of figure 1, with the reversal of the double planetary gearset.

Reference should now be made to FIG. 8, which shows a variation of the embodiment of FIG. 1, where the double planetary gearset 50 is reversed.

The double planetary gearset 50 of FIG. 1 can be recognized in FIG. 8. It includes the same basic planetary gearsets 10 and 20, joined by the sun gears 11 and 21 and by the planet carrier 12 and the ring gear 24, respectively fixed for rotation with each other.

In contrast to the embodiment of figure 1, the double planetary gearset 50 is reversed front to back, and the four members A, B, C, D are permutated. The fourth member D in FIG. 1 is now referred to as the first member A and is associated with the first control clutch $C_1$, the third member C in figure 1 is now referred to as the second member B and is fixed to the output shaft S, the second member B in FIG. 1 is now referred to as the third member C and is associated with the third control clutch $C_3$ and with the first control brake $B_1$, and the first member A in FIG. 1 is now referred to as the fourth member D and is associated with the second control clutch $C_2$ and with the second control brake $B_2$.

This being said, the description of operation is otherwise the same as that of FIG. 1, and the selective table of friction elements the same as in FIG. 2, with no modifications.

Figure 9:
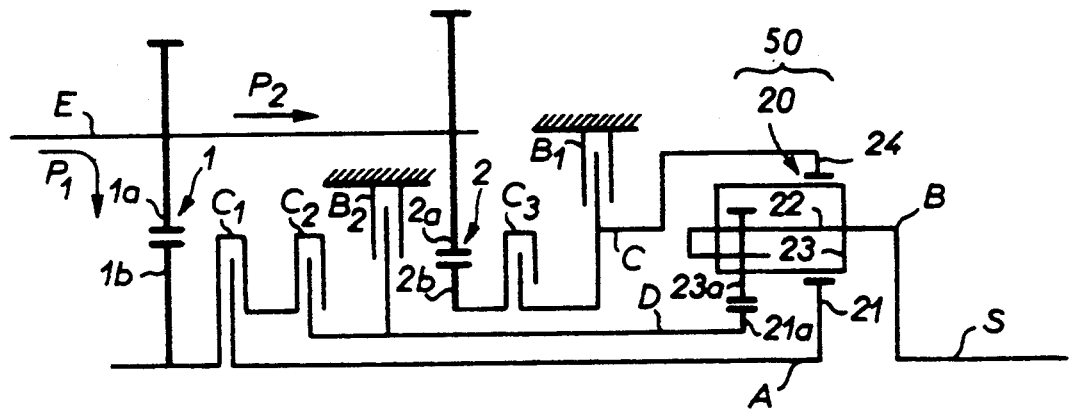
FIG. 9 shows a variation of the embodiment of figure 4, with the reversal of the double planetary gearset.
Figure 10:
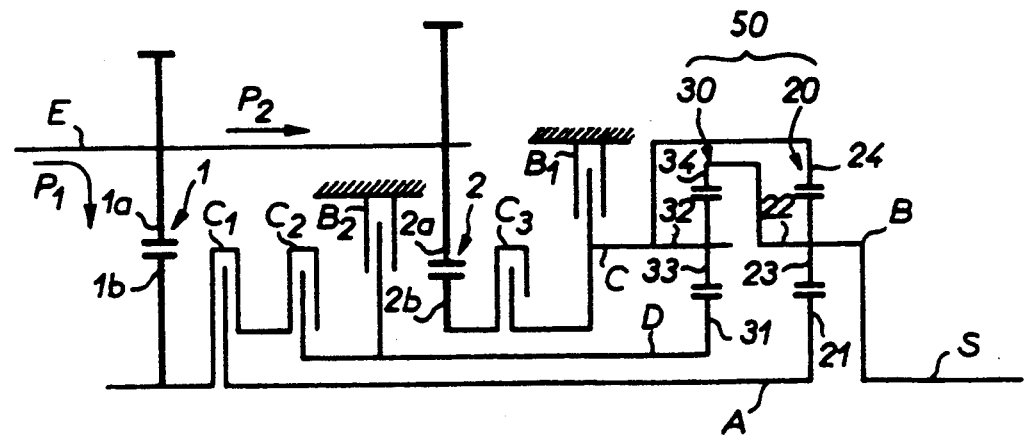
FIG. 10 shows a variation of the embodiment of FIG. 5, with the reversal of the double planetary gearset.
Figure 11:
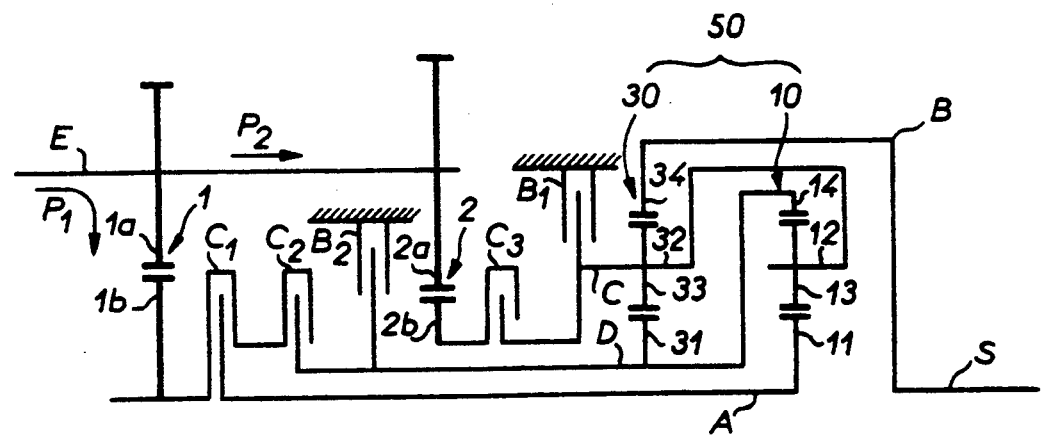
FIG. 11 shows a variation of the embodiment of FIG. 6, with the reversal of the double planetary gearset.

FIGS. 9, 10 and 11 successively show the same variations with regard to FIGS. 4, 5 and 6, as FIG. 8 with regard to FIG. 1. In all these figures, the double planetary gearset 50 is reversed in the same way.

Example 5 below is selected to provide transmission ratios common to all these variations, having the same steps with very slight differences. This example is to be compared with Example 1. All gear sizes in the basic planetary gearsets remain the same, and only those in the parallel gearsets are modified.

EXAMPLE 5

FIGS. 8, 9, 10 and 11.

Same planetary gearsets as in Example 1, but reversed.

| Parallel gearsets | | Basic planetary gearsets | |
|---|---|---|---|
| Gearset 1 | | Gearset 10 | |
| Gear 1a | 41 teeth | Sun gear 11 | 50 teeth |
| Gear 1b | 51 teeth | Ring gear 14 | 88 teeth |
| Speed ratio $G_1$ | 0.804 | Planet pinions 13 | 19 teeth |
| Gearset 2 | | Gearset 20 | |
| Gear 2a | 50 teeth | Sun gear 21 | 41 teeth |
| Gear 2b | 42 teeth | Ring gear 24 | 85 teeth |
| Speed ratio $G_2$ | 1.190 | Planet pinions 23 | 22 teeth |
| | | Gearset 30 | |
| | | Sun gear 31 | 50 teeth |
| | | Ring gear 34 | 88 teeth |
| | | Planet pinions 33 | 19 teeth |
| | | Ravigneaux gearset | |
| | | Sun gear 21 | 41 teeth |
| | | Ring gear 24 | 85 teeth |
| | | Planet pinions 23 | 22 teeth |
| | | Planet pinions 23a | 23 teeth |
| | | Sun gear 21a | 31 teeth |

| Gears | Transmission ratios | | Steps |
|---|---|---|---|
| 1st | 3.830 | | |
| | | } | 1.754 |
| 2nd | 2.184 | | |
| | | } | 1.755 |
| 3rd | 1.244 | | |
| | | } | 1.325 |
| 4th | 0.939 | | |
| | | } | 1.325 |
| 5th | 0.709 | | |
| | | } | 1.325 |
| 6th | 0.535 | | |
| Reverse drive | 2.179 | | |

These new transmission ratios, common to FIGS. 8, 9, 10 and 11, show a progression as favorable as that of Example 1, and are equally suited to five- or six-speed transmissions. Furthermore, it will be noticed that three steps out of five, namely the first/second, third/fourth, and fourth/fifth steps are unchanged.

Clearly, the Ravigneaux gearset of FIG. 3 could also be reversed in the same way, and the gear sizes only in the simple planetary gearset 3 modified, so as to obtain transmission ratios proportional to the above ratios, with the same steps. Furthermore, starting from these new examples, modifications of gear sizes would make it easy to offer large diversities of new transmission ratios, again set in very favorable progressions.

Figure 12:
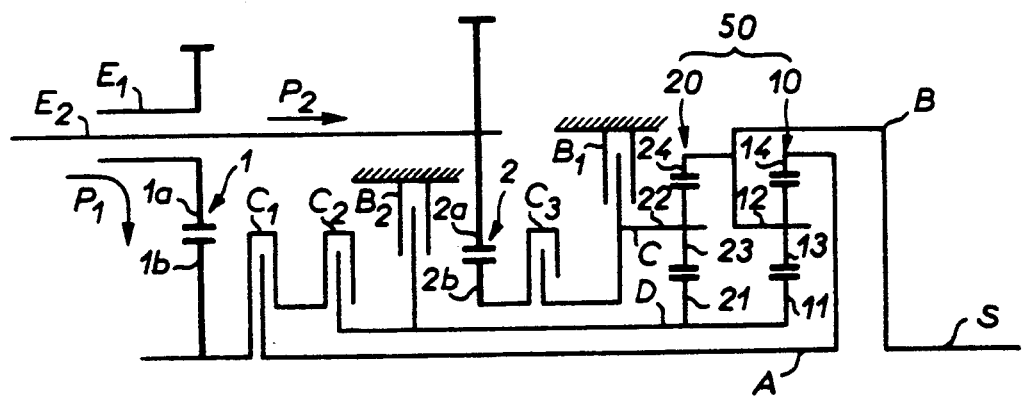
FIG. 12 is a schematic view of a third embodiment of the invention, with two separate coaxial input shafts, derived from the embodiment of FIG. 1.

Reference should now be made to figure 12, which shows a third embodiment of the invention, with two separate coaxial input shafts $E_1$, $E_2$, derived from the first embodiment of FIG. 1.

All parts common to FIGS. 1 and 12 or parts having the same functions keep the same reference numbers. In contrast to the embodiment of FIG. 1, the input shaft E is divided into a first coaxial shaft $E_1$ carrying the gear 1a of the first parallel gearset 1 and forming an input for the first power path $P_1$, and into a second coaxial shaft $E_2$ carrying the gear 2a of the second parallel gearset 2 and forming an input for the second power path $P_2$.

Figure 13:
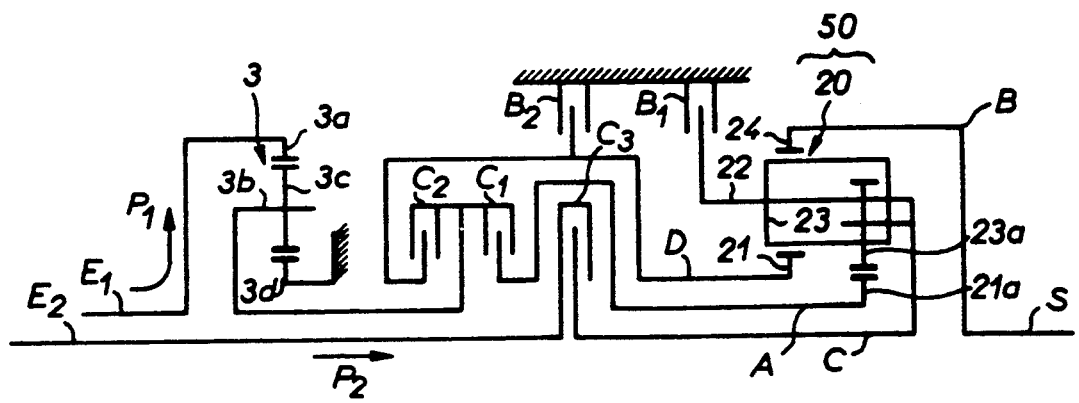
FIG. 13 is a schematic view of a fourth embodiment of the invention, with two separate coaxial input shafts, derived from the embodiment of FIG. 3.

FIG. 13 likewise shows a fourth embodiment of the invention, with two separate coaxial input shafts $E_1$, $E_2$, derived from the second embodiment of FIG. 3. All parts common to FIGS. 3 and 13 or parts having the same functions keep the same reference numbers. In contrast to the embodiment of FIG. 3, the input shaft E is divided into a first coaxial shaft $E_1$ carrying the ring gear 3a of the simple planetary gearset 3 and forming an input for the first power path $P_1$, and into a second coaxial shaft $E_2$ directly driving the third control clutch $C_3$, and being identified with the second power path $P_2$ in direct drive.

In both embodiments, the two power paths $P_1$ and $P_2$ are adapted to be coupled to two different power sources. The selective table of friction elements of FIG. 2 then immediately identifies the combinations dependent on the one or the other of these two power sources.

Figure 14:
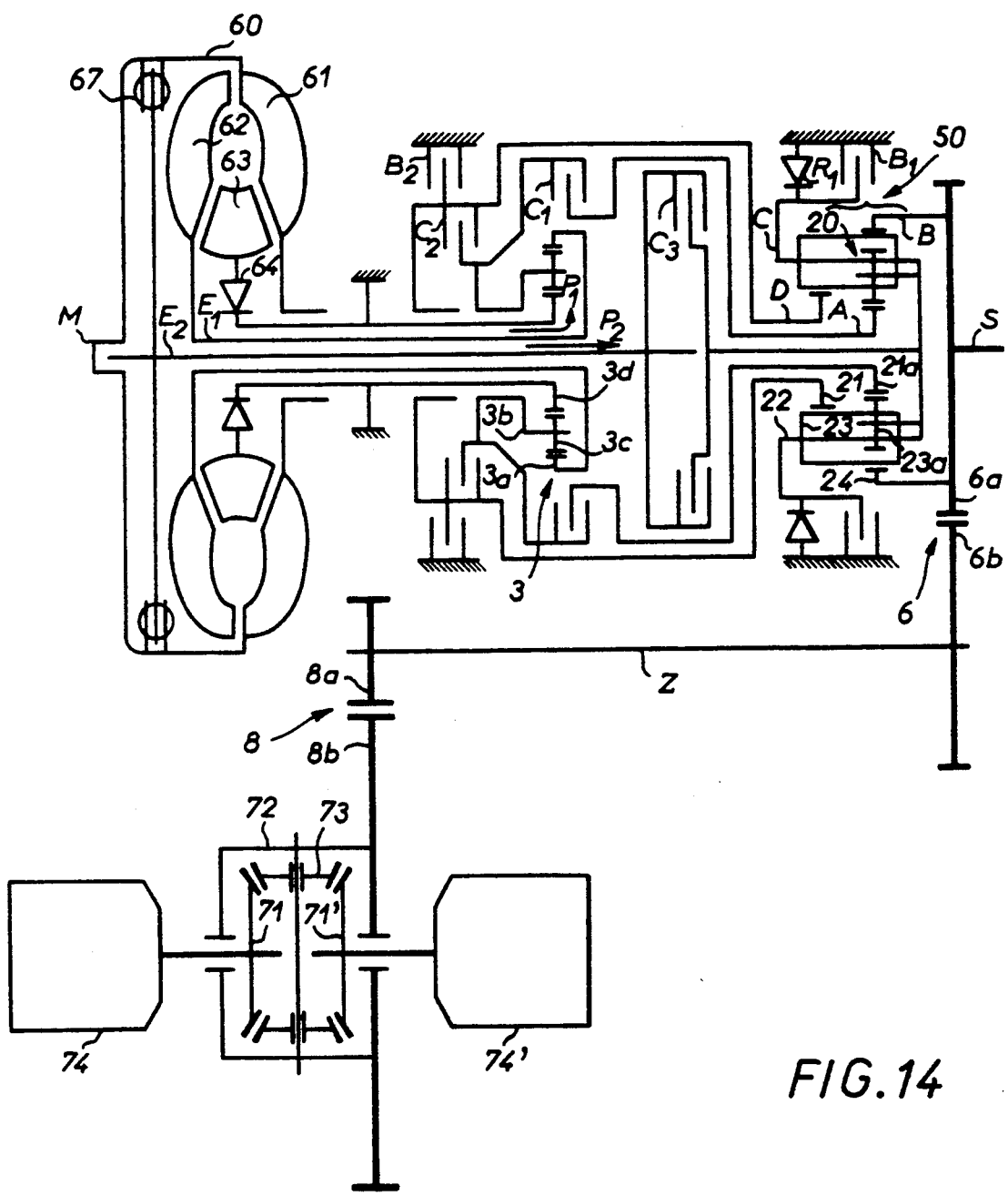
FIG. 14 is a schematic view of a transmission derived from the embodiment of FIG. 13, driven by a hydraulic torque converter, and for direct end-mounting on short transverse engines.

Reference should be made for example to FIG. 14, which is a schematic view of a transmission derived from the embodiment of figure 13, driven by a hydraulic torque converter 60 from a single power source M, and directly end-mounted on a short transverse engine.

All parts common to FIGS. 13 and 14 or parts having the same functions keep the same reference numbers. In a conventional way, the torque converter 60 comprises an impeller 61, a turbine 62, a stator 63, a freewheel device 64, and a torsional vibration damper 67. The first power path $P_1$ is coupled through the first coaxial input shaft $E_1$ to the turbine 62 subject to slip and is referred to as the hydrokinetic power path, whereas the second power path $P_2$ identified with the second coaxial input shaft $E_2$ is coupled through the vibration damper 67 to the impeller 61 not subject to slip, and is referred to as the mechanical power path.

With an arrangement of this kind, the reverse drive, the first, second and third gears are hydrokinetic and subject to the entire slip of the turbine, the fourth and fifth gears are compound and subject to partial slip, and the sixth gear is mechanical and not subject to slip. A freewheel device $R_1$ added in parallel with the first control brake $B_1$ to facilitate first/second up-shifts and second/first down-shifts in a manner that is known per se, does not interfere in any way in this operation.

In a conventional way, the transmission utilizes also a parallel counter gearset 6 including a drive gear 6a fixed to the output shaft S and a driven gear 6b fixed to an intermediate shaft Z, and a parallel final drive 8 including a pinion 8a fixed to the intermediate shaft Z and a gearwheel 8b fixed to a differential assembly 72, providing on the whole a final reduction ratio. The differential assembly 72 includes planet pinions 73 meshing with sun gears 71 and 71', which drive the two lateral outputs 74 and 74' to the driving wheels.

Considering the small number of components, it will be understood that such a transmission in accordance with the invention is again very short, and adapted to be directly mounted inline with a short transverse engine, in place of an existing compact automatic transmission having four speeds only.

Figure 15:
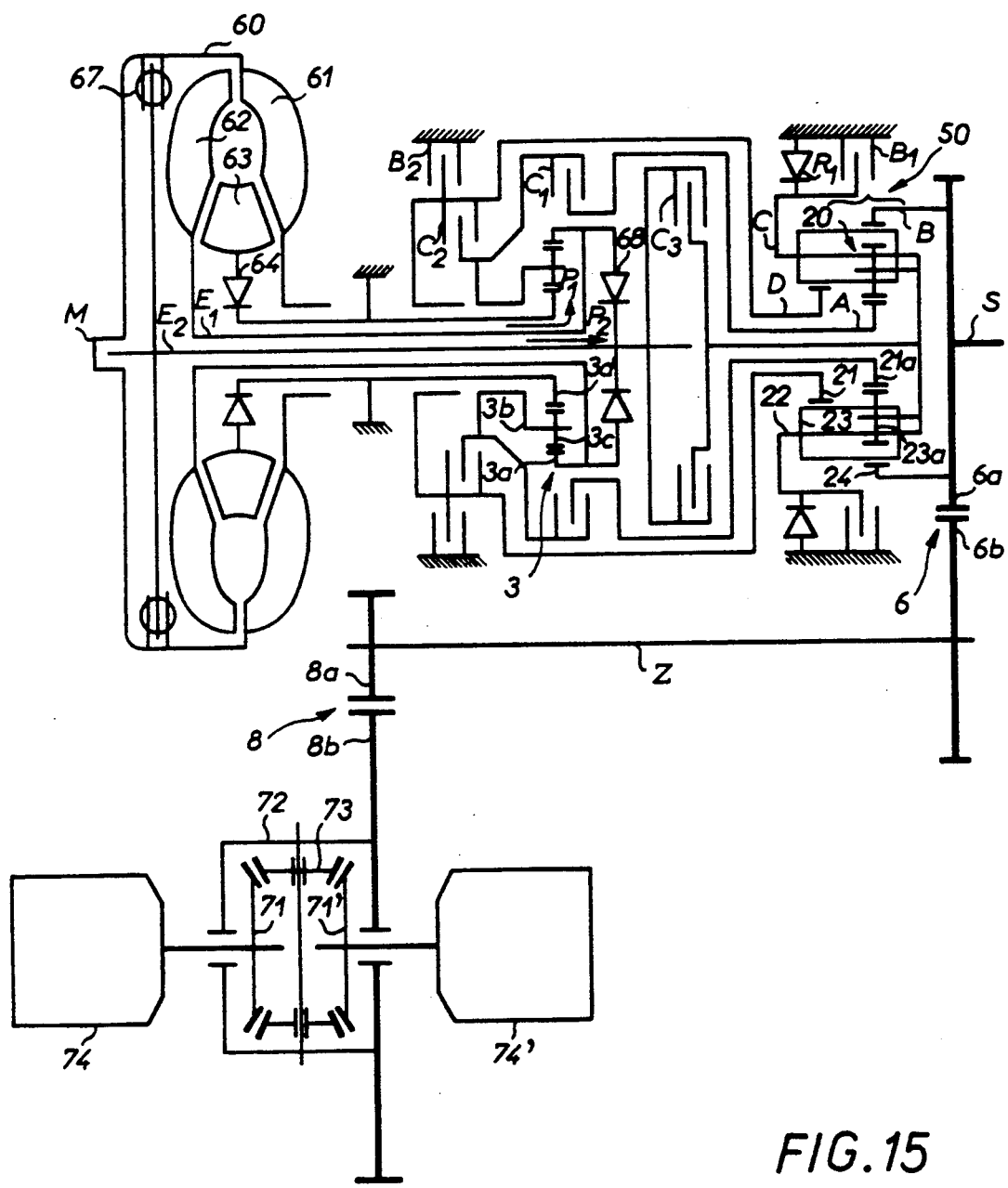
FIG. 15 shows a variation of the embodiment of figure 14, using a freewheel device between the two separate coaxial input shafts.

FIG. 15 shows a variation of this transmission, where a freewheel device 68 is located between the two coaxial input shafts $E_1$, $E_2$, so as to prevent the first coaxial input shaft $E_1$ from rotating faster than the second coaxial input shaft $E_2$. The gears subject to slip then become subject to slip only in traction or only during engine braking.

Table 1, in which the asterisk * denotes the operation of the freewheel device 68, summarizes the nature of each of the gears thus obtained:

TABLE 1

| Gears | Traction | Engine braking |
|---|---|---|
| 1st | Hydrokinetic | Mechanical* |

TABLE 1-continued

| Gears | Traction | Engine braking |
|---|---|---|
| 2nd | Hydrokinetic | Mechanical* |
| 3rd | Hydrokinetic | Mechanical* |
| 4th | Compound | Mechanical* |
| 5th | Mechanical* | Compound |
| 6th | Mechanical | Mechanical |
| Reverse drive | Hydrokinetic | Mechanical* |

It will be appreciated that the slip of the torque converter 60 is partially eliminated in fourth gear, and totally eliminated in fifth and sixth gears and during engine braking, the residual slip during engine braking in fifth gear being negligible.

Examples 6 and 7 below offer two new series of transmission ratios, which again are very well suited to five- or six-speed transmissions, and clearly apply in exactly the same way to the embodiments of FIGS. 3, 13, 14 and 15. As in preceding Examples, transmission ratios concern input shaft E or input shafts $E_1$, $E_2$, and output shaft S. They do not include the slip of the torque converter nor the final reduction ratio. Furthermore, to underline the importance of speed ratios $G_1$ and $G_2$ in the design flexibility, it must be noted that Example 7 differs from Example 6 only by the modification of the simple planetary gearset 3, while the double planetary gearset 50 —here of the Ravigneaux type— is unchanged.

EXAMPLE 6

FIGS. 3, 13, 14 and 15.
Same Ravigneaux gearset as in Example 7.

| Simple planetary gearset 3 | | Ravigneaux gearset | |
|---|---|---|---|
| Ring gear 3a | 75 teeth | Sun gear 21 | 33 teeth |
| Sun gear 3d | 45 teeth | Ring gear 24 | 75 teeth |
| Planet pinions 3c | 15 teeth | Planet pinions 23 | 21 teeth |
| Speed ratio $G_1$ | 0.625 | Planet pinions 23a | 19 teeth |
| | | Sun gear 21a | 27 teeth |

| Gears | Transmission ratios | Steps |
|---|---|---|
| 1st | 4.444 | |
| | | } 1.800 |
| 2nd | 2.469 | |
| | | } 1.543 |
| 3rd | 1.600 | |
| | | } 1.384 |
| 4th | 1.156 | |
| | | } 1.347 |
| 5th | 0.858 | |
| | | } 1.236 |
| 6th | 0.694 | |
| Reverse drive | 3.636 | |

EXAMPLE 7

FIGS. 3, 13, 14 and 15.
Same Ravigneaux gearset as in Example 6.

| Simple planetary gearset 3 | | Ravigneaux gearset | |
|---|---|---|---|
| Ring gear 3a | 65 teeth | Sun gear 21 | 33 teeth |
| Sun gear 3d | 31 teeth | Ring gear 24 | 75 teeth |
| Planet pinions 3c | 17 teeth | Planet pinions 23 | 21 teeth |
| Speed ratio $G_1$ | 0.677 | Planet pinions 23a | 19 teeth |
| | | Sun gear 21a | 27 teeth |

| Gears | Transmission ratios | Steps |
|---|---|---|
| 1st | 4.102 | |
| | | } 1.800 |

-continued

| | | | |
|---|---|---|---|
| 2nd | 2.279 | } | 1.543 |
| 3rd | 1.477 | } | 1.305 |
| 4th | 1.132 | } | 1.292 |
| 5th | 0.876 | } | 1.261 |
| 6th | 0.694 | | |
| Reverse drive | 3.357 | | |

The invention is not limited to the embodiments described and shown for illustrative purposes only, but encompasses all variations. In particular, other arrangements of the two power paths $P_1$, $P_2$, the two different speed ratios $G_1$, $G_2$, and/or the double planetary gearset 50 will fall within the true spirit and scope of the invention as defined in the appended claims.

What I claim is:

1. A multispeed automatic transmission, in particular for automobile vehicles, comprising between an input shaft and an output shaft and housed in a casing:
   a first power bath having a first fixed speed ratio and including a first control clutch and a second control clutch,
   a second power path having a second fixed speed ratio, higher than said first fixed speed ratio and in the same direction, and including a third control clutch, and
   first and second control brakes being associated with respective ones of said power paths,
   a double planetary gearset, concentric with the output shaft and including in order of rotational speed, first, second, third and fourth members, said first control clutch being operable to couple said first member to the input shaft through said first power path, said second member being fixed for rotation with the output shaft, said third control clutch being operable to couple said third member to the input shaft through said second power path, said first control brake being operable to fix said third member against rotation, said second control clutch being operable to couple said fourth member to the input shaft through said first power path, and said second control brake being operable to fix said fourth member against rotation, said transmission providing six forward gears, a braked neutral position and a reverse drive by selective operation in pairs of said first, second and third control clutches and said first and second control brakes, said first control clutch and said first control brake being operable to define a first forward gear, said first control clutch and said second control brake being operable to define a second forward gear, said first control clutch and said second control clutch being operable to define a third forward gear, said first control clutch and said third control clutch being operable to define a fourth forward gear, said second control clutch and said third control clutch being operable to define a fifth forward gear, said third control clutch and said second control brake being operable to define a sixth forward gear, said first and second control brakes being operable to define a braked neutral position, and said second control clutch and said first control brake being operable to define reverse drive.

2. An automatic transmission according to claim 1, wherein the double planetary gearset comprises a first basic planetary gearset having a first planet carrier carrying first planet pinions meshing with a first sun gear and a first ring gear, and a second basic planetary gearset having a second planet carrier carrying second planet pinions meshing with a second sun gear and a second ring gear, two of said first, second, third and fourth members being defined by a single element of one of said basic planetary gearsets, and two other members being defined by elements of both of said basic planetary gearsets fixed for rotation with each other.

3. An automatic transmission according to claim 2, wherein said first member is formed by the first ring gear, said second member being formed by the first planet carrier and the second ring gear fixed for rotation with each other, said third member being formed by the second planet carrier, and said fourth member being formed by the first and second sun gears fixed for rotation with each other.

4. An automatic transmission according to claim 2, wherein said first member is formed by the first sun gear, said second member being formed by the first planet carrier and the second ring gear fixed for rotation with each other, said third member being formed by the first ring gear and the second planet carrier fixed for rotation with each other, and said fourth member being formed by the second sun gear.

5. An automatic transmission according to claim 2, wherein said first member is formed by the first ring gear and the second sun gear fixed for rotation with each other, said second member being formed by the first and second planet carriers fixed for rotation with each other, said third member being formed by the second ring gear, and said fourth member being formed by the first sun gear.

6. An automatic transmission according to claim 2, wherein said first member is formed by the first and second sun gears fixed for rotation with each other, said second member being formed by the second planet carrier, said third member being formed by the first planet carrier and the second ring gear fixed for rotation with each other, and said fourth member being formed by the first ring gear.

7. An automatic transmission according to claim 2, wherein said first member is formed by the first sun gear, said second member being formed by the second ring gear, said third member being formed by the first and second planet carriers fixed for rotation with each other, and said fourth member being formed by the first ring gear and the second sun gear fixed for rotation with each other.

8. An automatic transmission according to claim 1, wherein said double planetary gearset comprises a single basic planetary gearset having a planet carrier carrying planet pinions meshing with a sun gear and a ring gear, said planet carrier carrying additional planet pinions meshing with the first-mentioned planet pinions and an additional sun gear, three of said members being parts of said single basic planetary gearset and one of said members being said additional sun gear.

9. An automatic transmission according to claim 8, wherein said first member is formed by the additional sun gear, said second member being formed by the ring gear, said third member being formed by the planet carrier, and said fourth member being formed by the first-mentioned sun gear.

10. An automatic transmission according to claim 8, wherein said first member is formed by the first-mentioned sun gear, said second member being formed by the planet carrier, said third member being formed by the ring gear, and said fourth member being formed by the additional sun gear.

11. An automatic transmission according to claim 1, wherein the input shaft and the output shaft are parallel to each other, said first power path including a first parallel gearset of constant-mesh gearwheels providing said first fixed speed ratio, and said second power path including a second parallel gearset of constant-mesh gearwheels providing said second fixed speed ratio.

12. An automatic transmission according to claim 1, wherein the input shaft and the output shaft are in alignment with each other, said first power path including a three-member planetary gearset having a member fixed to the casing and providing said first fixed speed ratio lower than unity, said second power path being a direct drive and said second fixed speed ratio being equal to unity.

13. An automatic transmission according to claim 1, wherein the input shaft is divided into a first coaxial input shaft forming an input for said first power path and a second coaxial input shaft forming an input for said second power path, whereby said first coaxial input shaft is adapted to drive said first and fourth members according to said first fixed speed ratio, and said second coaxial input shaft is adapted to drive said third member according to said second fixed speed ratio.

14. An automatic transmission according to claim 13, said transmission being coupled to a single power source by the intermediary of a coupling device having a driven part subject to slip relative to a driving part not subject to slip, said first power path being coupled through said first coaxial input shaft to said driven part, and said second power path being coupled through said second coaxial input shaft to said driving part, whereby said first, second and third gears and said reverse drive are subject to the maximum operating slip of said coupling device, said fourth and fifth gears are subject to partial slip, and said sixth gear is not subject to slip.

15. An automatic transmission according to claim 14, further comprising freewheel means located between said two coaxial input shafts and adapted to prevent said first coaxial input shaft from rotating faster than said second coaxial input shaft, whereby said fifth gear is not subject to slip in traction, and said first, second, third and fourth gears and said reverse drive are not subject to slip during engine braking.

16. A multispeed automatic transmission, in particular for automobile vehicles, comprising between an input shaft and an output shaft and housed in a casing:
a first power path having a second fixed speed ratio, higher than said first fixed speed ratio and in the same direction, and including a third control clutch, and
a second power path having a second fixed speed ratio and including a first control clutch and a second control clutch,
first and second control brakes being associated with respective ones of said power paths,
a double planetary gearset, concentric with the output shaft and including in order of rotational speed, first, second, third and fourth members, said first control clutch being operable to couple said first member to the input shaft through said first power path, said second member being fixed for rotation with the output shaft, said third control clutch being operable to couple said third member to the input shaft through said second power path, said first control brake being operable to fix said third member against rotation, said second control clutch being operable to couple said fourth member to the input shaft through said first power path, and said second control brake being operable to fix said fourth member against rotation,
the input shaft and the output shaft being in alignment with each other, said first power path including a three-member planetary gearset having a member fixed to the casing and providing said first fixed speed ratio lower than unity, said second power path being a direct drive and said second fixed speed ratio being equal to unity.

17. A multispeed automatic transmission, in particular for automobile vehicle, comprising between an input shaft and an output shaft and housed in a casing:
a first power path having a first fixed speed ratio and including a first control clutch and a second control clutch,
a second power path having a second fixed speed ratio, higher than said first fixed speed ratio and in the same direction, and including a third control clutch, and
first and second control brakes being associated with respective ones of said power paths,
a double planetary gearset, concentric with the output shaft and including in order of rotational speed, first, second, third and fourth members, said first control clutch being operable to couple said first member to the input shaft through said first power path, said second member being fixed for rotation with the output shaft, said third control clutch being operable to couple said third member to the input shaft through said second power path, said first control brake being operable to fix said third member against rotation, said second control clutch being operable to couple said fourth member to the input shaft through said first power path, and said second control brake being operable to fix said fourth member against rotation,
the input shaft being divided into a first coaxial input shaft forming an input for said first power path and a second coaxial input shaft forming an input for said second power path,
said transmission being coupled to a single power source by the intermediate of a coupling device having a driven part subject to slip relative to a driving part not subject to slip, said first power path being coupled through said first coaxial input shaft to said driven part, and said second power path being coupled through said second coaxial input shaft to said driving part, and
freewheel means located between said two coaxial input shaft and adapted to prevent said first coaxial input shaft from rotation faster than said second coaxial input shaft.

* * * * *

UNITED STATES PATENT AND TRADEMARK OFFICE
CERTIFICATE OF CORRECTION

PATENT NO. : 5,106,352
DATED : April 21, 1992
INVENTOR(S) : Pierre Andre Georges LEPELLETIER It is certified that error appears in the above—identified patent and that said Letters Patent is hereby corrected as shown below:

On the title page, in the Abstract, line 2, after "input shaft" insert --and--;

On the title page, in the Abstract, line 3, cancel "and".

Column 7, line 47, change "or" to --of--;

line 59, change "66" second occurrence to --62--.

Column 15, claim 16, line 52, change "second" to --first--;

lines 53-55, change "higher than said first fixed speed ratio and in the same direction, and including a third control clutch, and" to --and including a first control clutch and a second control clutch,--;

lines 57-58, change "and including a first control clutch and a second control clutch," to --higher than said first fixed speed ratio and in the same direction, and including a third control clutch, and--.

Column 16, claim 17, line 21, change "vehicle," to --vehicles,--;

line 52, change "intermediate" to --intermediary--;

line 60, change "shaft" to --shafts--;

UNITED STATES PATENT AND TRADEMARK OFFICE
CERTIFICATE OF CORRECTION

PATENT NO. : 5,106,352
DATED : April 21, 1992
INVENTOR(S) : Pierre Andre Georges LEPELLETIER It is certified that error appears in the above-indentified patent and that said Letters Patent is hereby corrected as shown below:

Column 16, claim 17, line 62, change "rotation" to --rotating--.

Signed and Sealed this

Seventh Day of September, 1993

Attest:

BRUCE LEHMAN

Attesting Officer — Commissioner of Patents and Trademarks